(12) United States Patent
Egolf et al.

(10) Patent No.: US 6,185,482 B1
(45) Date of Patent: Feb. 6, 2001

(54) SYSTEM AND METHOD FOR RMS OVERCURRENT BACKUP FUNCTION

(75) Inventors: Michael Egolf, Apex; David G. Hart; James D. Stoupis, both of Raleigh, all of NC (US)

(73) Assignee: ABB Power T&D Company Inc., Raleigh, NC (US)

(*) Notice: Under 35 U.S.C. 154(b), the term of this patent shall be extended for 0 days.

(21) Appl. No.: 09/037,359

(22) Filed: Mar. 10, 1998

(51) Int. Cl.$^7$ ................................ H02J 1/14; H02J 3/02; H02J 3/12; H02J 9/00; H02J 17/00
(52) U.S. Cl. .................. 700/293; 700/292; 700/294; 700/297; 700/298; 361/86; 361/96
(58) Field of Search ................................ 700/293, 292, 700/294, 297, 298; 361/86, 96; 364/484

(56) References Cited

U.S. PATENT DOCUMENTS

| | | | |
|---|---|---|---|
| 3,755,734 | 8/1973 | Blanyer | 324/78 Z |
| 3,863,133 | 1/1975 | Pollard | 321/5 |
| 3,984,771 | 10/1976 | Nossen et al. | 324/83 D |
| 4,053,839 | 10/1977 | Knoedl, Jr. | 328/38 |
| 4,291,299 | 9/1981 | Hinz et al. | 340/347 AD |
| 4,319,329 | 3/1982 | Girgis et al. | 364/484 |
| 4,432,031 * | 2/1984 | Premerlani | 361/97 |
| 4,547,726 | 10/1985 | Premerlani | 324/78 Z |
| 4,672,501 * | 6/1987 | Bilac et al. | 361/96 |
| 4,672,555 | 6/1987 | Hart et al. | 364/483 |
| 4,715,000 | 12/1987 | Premerlani | 364/484 |
| 4,739,277 | 4/1988 | Hollister et al. | 328/55 |
| 4,774,621 | 9/1988 | Andow | 361/80 |
| 4,803,635 | 2/1989 | Andow | 364/483 |
| 4,815,002 | 3/1989 | Verbanets | 364/484 |
| 4,819,179 | 4/1989 | Klein | 364/484 |
| 4,827,259 | 5/1989 | Murphy et al. | 341/123 |
| 4,896,337 | 1/1990 | Bushy, Jr. | 375/118 |
| 4,939,761 | 7/1990 | Gall et al. | 378/99 |
| 4,953,117 | 8/1990 | Lagadec | 364/724.1 |
| 4,967,304 * | 10/1990 | Dougherty | 361/31 |
| 4,977,513 * | 12/1990 | LaPalme | 364/483 |
| 5,017,860 | 5/1991 | Germer et al. | 324/142 |
| 5,151,869 | 9/1992 | Alcala | 364/497 |
| 5,179,376 | 1/1993 | Pomatto | 340/870.02 |

(List continued on next page.)

OTHER PUBLICATIONS

Adamiak, M.G. et al., "Performance Assessment of a New Digital Subsystem for Generator Protection", Presented to the Electric Council of New England on Oct. 13–14, 1994, Bangor, Maine, 1–16.

Benmouyal, G., "An Adaptive Sampling–Interval Generator for Digital Relaying", *IEEE Trans. on Power Delivery*, Jul. 1989, 4(3), 1602–1609.

Benmouyal, G. et al., "Field Experience with a Digital Relay for Synchronous Generators", *IEEE Trans. on Power Delivery*, Oct. 1992, 7(4), 1984–1992.

Phadke, A.G. et al., "A New Measurement Technique for Tracking Voltage Phasors, Local System Frequency, and Rate of Change of Frequency", *IEEE Trans. on Power Apparatus and Systems*, May 1983, vol. PAS102(5), 1025–1038.

*Primary Examiner*—Ayaz R. Sheikh
*Assistant Examiner*—Frantz Blanchard Jean
(74) *Attorney, Agent, or Firm*—Woodcock Washburn Kurtz Mackiewicz & Norris LLP (57) ABSTRACT

A method and apparatus for over current backup protection is provided. The method generates a set of root mean square (rms) values from samples that are taken from the system current. Several rms current values are averaged to generate an estimated rms over current value. The estimated over current value is compared with a predetermined threshold value. If the estimated current is above the predetermined threshold value, a fault protection mechanism, such as opening a circuit breaker, is activated. A generator protection unit having digital signal processing capabilities executes the inventive method to provide protection from over current episodes.

14 Claims, 12 Drawing Sheets

U.S. PATENT DOCUMENTS

| | | | |
|---|---|---|---|
| 5,376,894 | 12/1994 | Petranovich | 329/306 |
| 5,378,979 | 1/1995 | Lombardi | 324/107 |
| 5,406,495 | 4/1995 | Hill | 364/483 |
| 5,453,903 | 9/1995 | Chow | 361/79 |
| 5,461,329 | 10/1995 | Linehan et al. | 324/772 |
| 5,544,065 | 8/1996 | Engel et al. | 364/484 |
| 5,559,689 | 9/1996 | Kirchberg et al. | 363/95 |
| 5,566,211 | 10/1996 | Choi | 375/332 |
| 5,600,527 * | 2/1997 | Engel et al. | 361/93 |
| 5,671,112 * | 9/1997 | Hu et al. | 361/86 |
| 5,721,689 * | 2/1998 | Hart et al. | 364/484 |

* cited by examiner

SYSTEM AND METHOD FOR RMS OVERCURRENT BACKUP FUNCTION

CROSS REFERENCE TO RELATED APPLICATIONS

This application is related by subject matter to the inventions disclosed in commonly assigned U.S. patent application Ser. No. 08/574,357, filed Dec. 18, 1995, now U.S. Pat. No. 5,721,689, issued on Feb. 24, 1998 entitled "System and Method for Phasor Estimation and Frequency Tracking in Digital Protection Systems," the contents of which are hereby incorporated by reference.

FIELD OF THE INVENTION

The present invention relates to digital protection systems which employ frequency tracking and phasor estimation for fault detection. More particularly, the invention relates to a novel method and system for fault detection when input voltages that are typically used as source values in frequency tracking techniques become unavailable.

BACKGROUND OF THE INVENTION

Digital protection systems are used, for example, in power systems to monitor the voltage and current signals provided by electrical generators. Such digital protection systems may be embodied in a generator protection unit (GPU). A GPU estimates voltage and current phasors based upon the voltage and current signals and from those phasors detect various fault conditions requiring system shut down. The phasors are also used for metering functions performed by remote users and for other power system control functions. Abnormal conditions may additionally be detected through relatively large changes in the generator's operating frequency. Accordingly, an adaptive technique for tracking the generator frequency is important for both generating accurate voltage and current phasors and for monitoring fault conditions in the generator by detecting a significant change in the generator frequency.

Figure 1:
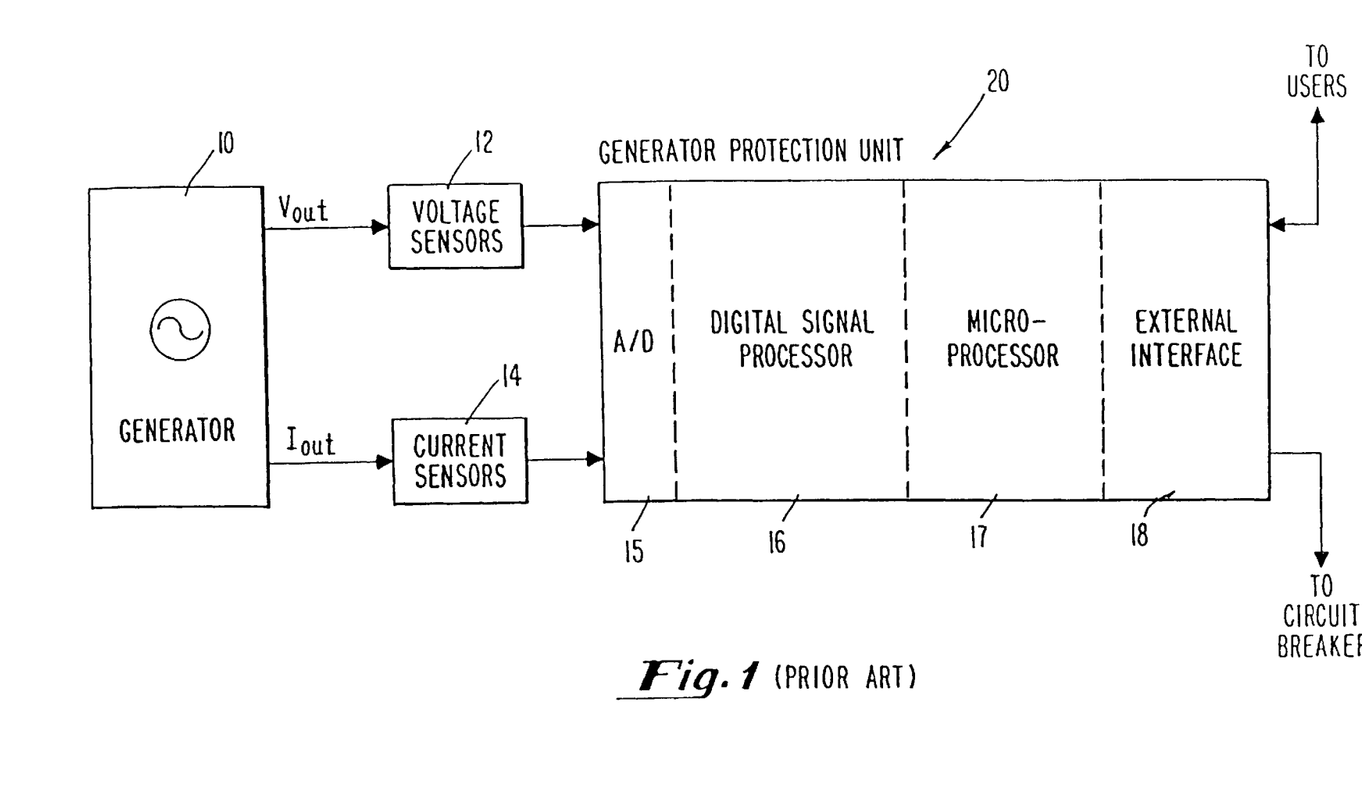
FIG. 1 shows a block diagram of a generator protection system.

FIG. 1 shows GPU 20 and generator 10. Voltage signals output from generator 10 ($V_{out}$) are sensed by voltage sensor 12. Potential transformers, resistive dividers, or the like, may be employed as voltage sensors. The sensed voltage signals are output from voltage sensor 12 to GPU 20. It should be understood that generator 10 produces three-phase power, and accordingly, the voltage signals output from generator 10 may include $V_A$, $V_B$, and $V_C$, or alternatively may include line-to-line voltages $V_{AB}$, $V_{BC}$, and $V_{CA}$.

Current sensor 14 such as current transformers, may be used to sense current signals output from generator 10 ($I_{out}$) to both GPU 20 and to the power system (not shown). If, for example, the current output to GPU 20 and to the power system are not equal then a fault condition may exist. The sensed currents, which may include each line current $I_A$, $I_B$, and $I_C$, is provided as input to the GPU 20.

GPU 20 includes A/D converter 15, digital signal processor (DSP) 16, microprocessor 17, and external interface 18. A/D converter 15 samples the sensed voltage and current signals and provides voltage and current samples to DSP 16. DSP 16 may generate a voltage phasor each sampling interval by utilizing a discrete fourier transform (DFT). A DFT and system for implementing the transform are discussed in commonly assigned co-pending U.S. patent application Ser. No. 08/574,357, filed Dec. 18, 1995, entitled "System and Method for Phasor Estimation and Frequency Tracking in Digital Protection Systems," the contents of which are hereby incorporated by reference. The operating frequency of generator 10 can be tracked based on the generated phasors. Phasor data and frequency estimates are output from DSP 16 to microprocessor 17.

Microprocessor 17 uses the phasor and frequency data to detect faults in the power system. If a fault or malfunction is detected, microprocessor 17 outputs a signal through external interface 18 to a circuit breaker (not shown) causing the circuit breaker to open its current carrying contacts so that the system is effectively shut down.

Thus, a fault protection system as described above receives sensed voltage signals, and from these signals generates phasor and frequency data which is subsequently used to detect faults in the power system. As noted, typically such systems have three phase voltage inputs. If any one of the three signals are available, a fault detection system as described above could operate. However, if none of the input voltage signals are available, the protection system cannot operate. Thus, systems and methods of fault protection analogous to those described above present the problem of providing fault protection when the input sensed voltage signals are not available. Furthermore, because generators operate over a wide frequency range, particularly during startup or shutdown, any solution to the problem of loss of input voltage must also be capable of operating over a wide frequency range.

SUMMARY OF THE INVENTION

The present invention fulfills these needs by providing a method and apparatus for detecting faults in the system when input voltages become unavailable.

In a preferred embodiment of the invention, there is provided a method of over current backup for a system having a current signal. The method comprises the following steps: sampling the current signal to produce a plurality of current samples; generating a plurality of root mean square (rms) current values from the plurality of current samples; generating a current estimate from the plurality of rms current values; and activating a fault protection mechanism if the current estimate is above a predetermined threshold. The step of sampling the current signal at a predetermined fixed rate to produce a plurality of current samples, comprises the following steps: obtaining a sample current measurement; determining whether frequency tracking is available; if frequency tracking is available, employing the frequency tracking; if frequency tracking is not available, determining whether a sufficient number of sample current measurements have been obtained to calculate an rms current value; and if a sufficient number of current measurements has not been obtained, obtaining an additional current measurement. A sufficient number of current measurements may be 32.

Each of the plurality of rms current values, $c_{rms}$, is estimated according to the following relationship:

$$c_{rms} = \sqrt{\frac{1}{N}\sum_{k=0}^{N-1} f_k^2}$$

where $f_k$ is the current sample at a particular instant and N is the number of samples per cycle of input current.

Each successive rms current value of the plurality of rms current values is calculated using eight current samples which were collected after the previous rms current value was calculated. The number of samples per cycle of input, N, may be 32. The current estimate may be the average of the plurality of rms current values. In one embodiment, the current estimate is the average of four consecutive rms current values. The threshold value is about 70% of the rated value of the system. The fault protection mechanism comprises opening a circuit breaker.

According to another aspect of the invention, there is disclosed a method for over current backup protection in a generator protection unit (GPU), wherein the generator outputs a plurality of current signals to the GPU. The method comprises the following steps: sampling the current signal to produce a plurality of current samples; generating a plurality of root mean square (rms) current values from the plurality of current samples; generating a current estimate from the plurality of rms current values; and activating a fault protection mechanism if the current estimate is above a predetermined threshold. The plurality of rms current values, $c_{rms}$, is estimated according to the following relationship:

$$c_{rms} = \sqrt{\frac{1}{N}\sum_{k=0}^{N-1} f_k^2}$$

where $f_k$ is the current sample at a particular instant and N is the number of samples per cycle of input current. The current estimate is the average of the plurality of rms current values.

According to another aspect of the invention, there is disclosed an apparatus for over current backup protection comprising the following items: a current sensor for sensing the current being transmitted; an A/D converter operably coupled to the current sensor for sampling the sensed voltage at a fixed sampling interval; a digital signal processor (DSP) operably coupled to the A/D converter for generating rms current values from the sensed voltage; and a microprocessor operably coupled to the DSP, having code therein for calculating a current estimate from the rms current values.

According to another aspect of the invention, there is provided a generator protection system for analyzing voltage and current signals output from a generator wherein the voltage and current signals are monitored by respective voltage and current sensors to produce a plurality of signals representative of voltage and current characteristics of the generator. The generator protection system comprises the following items: sampling means for receiving an input of the plurality of signals and sampling the plurality of signals at a predetermined fixed rate to provide an output of sampled signals; and a processing means coupled to the sampling means and receiving an input of the sampled data, the processing means estimating the current of the generator by carrying out at least one root mean square calculation.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

Generally, the present invention provides a method and system of providing backup detection of faults in a power transmission system. Typically, electrical energy is transmitted over large power grids in three phases and a neutral. Each phase is monitored by the present method and system to detect faults. The method and system operate by generating a current estimate using a root mean square (rms) calculation and triggering fault protection means such as circuit breakers when the current estimate indicates that a fault has occurred.

The rms of a function is calculated by taking the square root of the mean of the square of the particular function. This is represented mathematically as:

$$f_{rms} = \sqrt{\frac{1}{T}\int_0^T f(t)^2\, dt} \quad (1)$$

The integral shown in equation 1 can be approximated as the sum of the squares of the samples of the function over the same time period.

$$\int_0^T f(t)^2\, dt \cong \sum_{k=0}^{N-1} (f_k^2 \cdot \Delta t) \quad (2)$$

Substituting the sum of the squares of equation 2 for the integral in equation 1, the rms calculation can be expressed as:

$$f_{rms} = \sqrt{\frac{1}{T}\sum_{k=0}^{N-1}(f_k^2 \cdot \Delta t)} \quad (3)$$

$$\Delta t = \frac{1}{f_0 \cdot N} \quad (4)$$

where
$f_0$=nominal frequency
N=number of samples per cycle

The rms function is based on the assumption that there exists a constant number of samples, N, being taken per cycle and a constant nominal frequency, $f_0$. In the preferred embodiment, the nominal frequency is 60 Hz and the sampling frequency is 32. Of course, alternative values for $f_0$ and N could be used. Because N and f are assumed to be constant for purposes of the invention, by equation 4, $\Delta t$ is likewise constant.

As shown in equation 5, the inverse of the frequency is equal to the period.

$$f_0 = \frac{1}{T} \quad (5)$$

Substituting equation 5 into equation 4, $\Delta t$ becomes equal to the period T over the number of samples N.

$$T = \frac{1}{f_0} \Rightarrow \Delta t = \frac{T}{N} \quad (6)$$

Substituting equation 6 into equation 3 and moving the constant terms outside the summation, we arrive at the following mathematical representation of the rms.

$$f_{rms} = \sqrt{\frac{1}{N}\sum_{k=0}^{N-1} f_k^2} \quad (7)$$

Thus, the rms value of the current signal is the root of the "mean" of the square of the current samples taken over a fixed period of time.

The inventive method and system employ the rms calculation described above to generate a current estimate for each of three current phases and the neutral current. Depending upon the value of each current estimate, the appropriate fault protection steps such as opening a circuit breaker may be initiated.

Numerous methods exist by which an rms value may be employed to estimate the current. A first method involves computing a current estimate by taking multiple current signal samples and using the rms equation described above to calculate a current estimate. In the preferred embodiment, 32 current samples (N=32) are taken each cycle of the input signal. 8 samples may be collected in 4 ms. Thus, four 4 ms blocks (4×8=32) create a window in which a current estimate may be taken. This current signal data are placed in the rms equation (equation 7 above) to compute a current value. Thus, in this first method of generating a current estimate, each current sample along with the previous 31 samples are used in the rms equation to calculate a current estimate.

Figure 2:
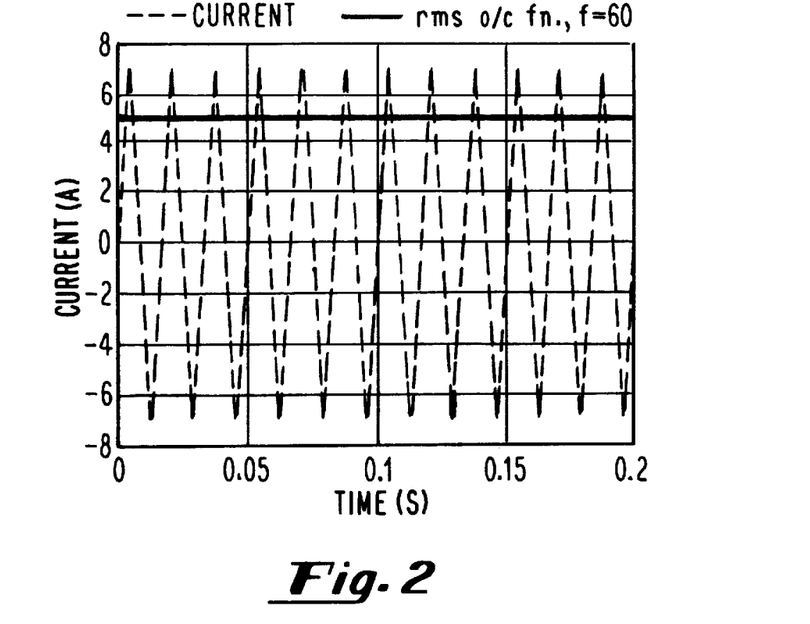
FIG. 2 provides a plot of actual current values for a 60 Hz input current along with a plot of a current estimate generated using a first root mean square (rms) estimation method.
Figure 3:
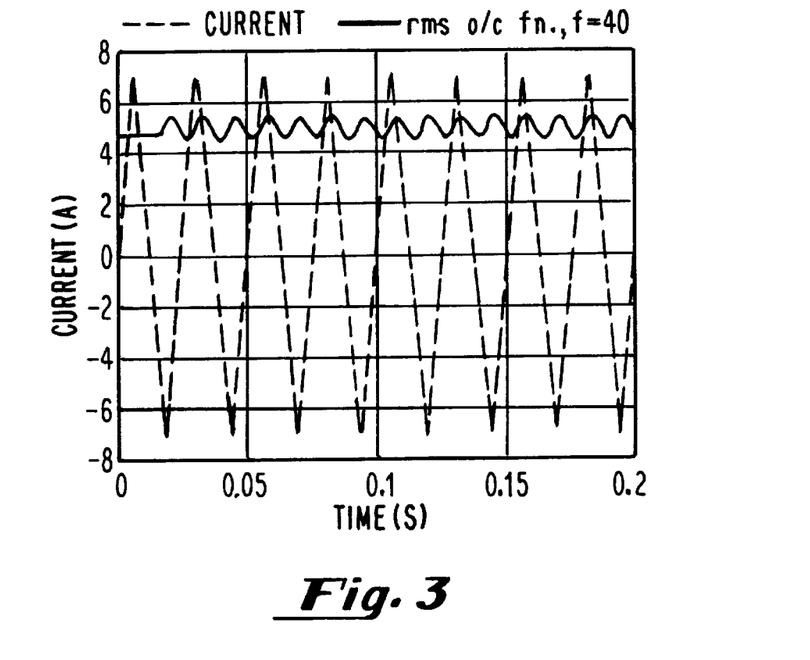
FIG. 3 provides a plot of the actual current values for a 40 Hz input current along with a plot of the current estimate generated using a first rms estimation method.
Figure 4:
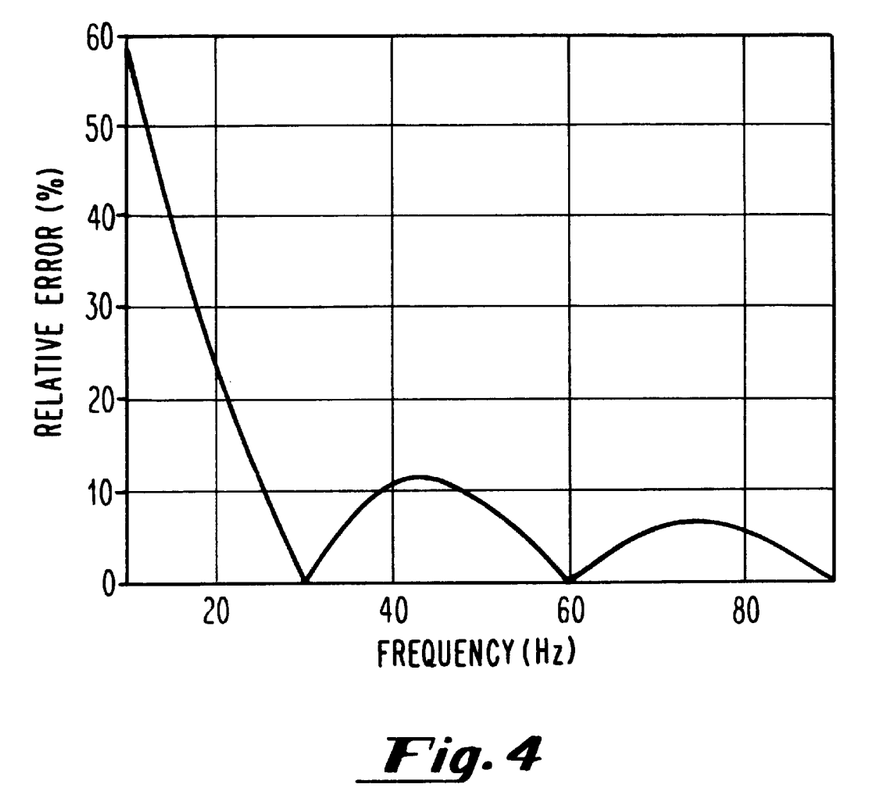
FIG. 4 is a graph of the relative percentage error in the rms current estimate generated using a first rms current estimation method for input values having various frequency values.

FIGS. 2 through 4 provide various graphs related to this first method of current estimate. FIG. 2 shows a plot of the actual current values along with a plot of the current estimate calculated using this first estimation method. The plots shown are for an input signal of 60 Hz. As shown, at 60 Hz, the current estimate generated by this first method is constant.

FIG. 3 like FIG. 2 shows a plot of the actual current values along with a plot of the current estimate computed by this first estimation method. The current signal is 40 Hz as opposed to 60 Hz. As shown, for a 40 Hz input signal, the current estimate oscillates between values. This is in contrast to the estimate for the 60 Hz signal of FIG. 2 which was constant. This current estimate at 40 Hz as well as other estimates taken at other current frequencies indicate that this first estimation method generates current estimates that have a comparatively large oscillation element.

FIG. 4 is a graph of the relative percentage error in the rms current estimate at various frequency values when the estimate is computed using this first method. As shown, the relative error for the rms current estimate goes to zero for frequencies that are multiples of 30 Hz.

Figure 5:
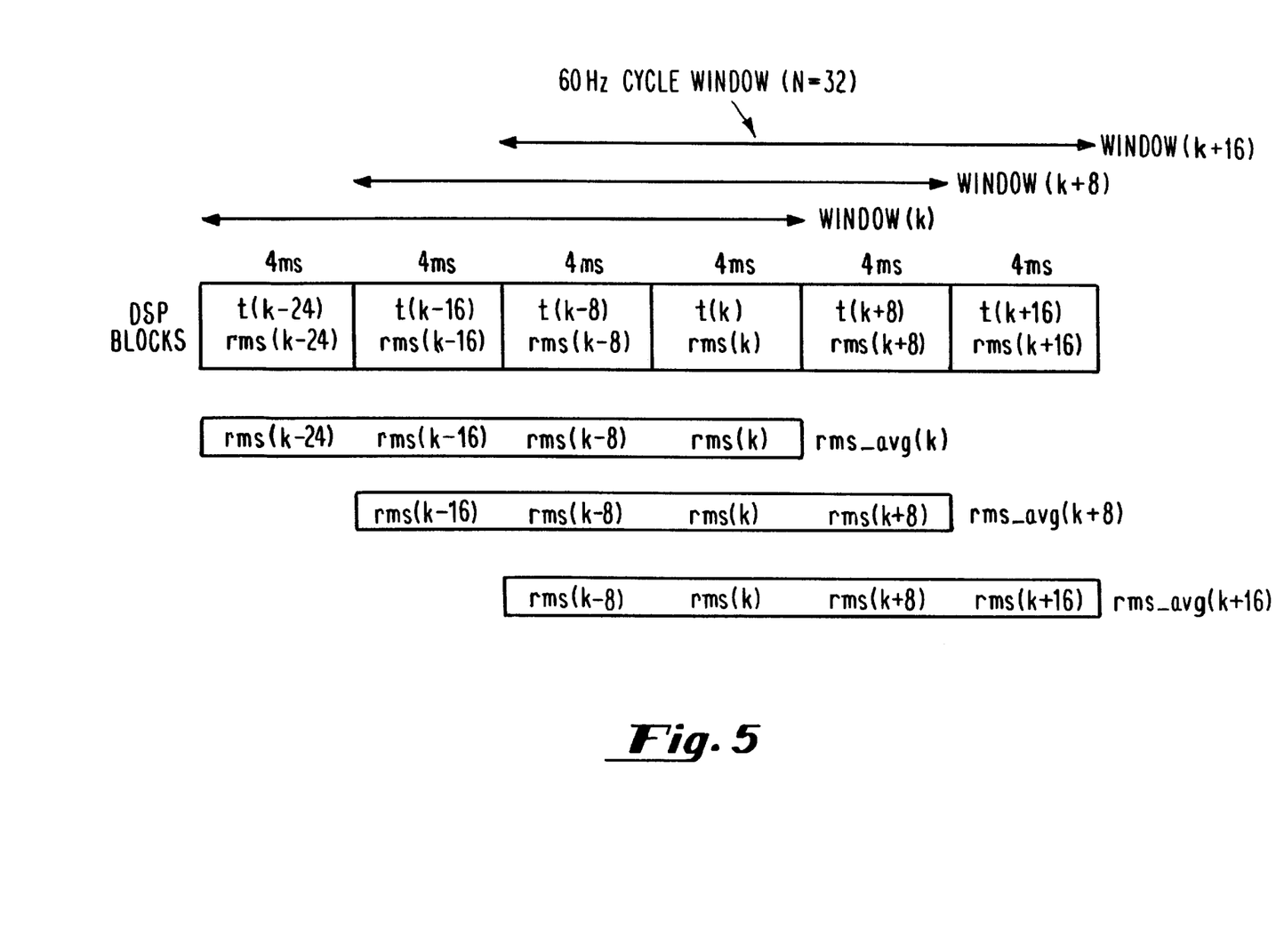
FIG. 5 illustrates the method of rms current calculations according to the present invention.

FIG. 5 illustrates the preferred method of rms current calculation. As shown at the center of FIG. 5, the digital signal processor of the preferred embodiment operates in 4 ms blocks. In any one of these 4 ms blocks, the digital signal processor (DSP) may operate on eight current samples. Thus, the time, t, and the rms values, rms, in any one DSP process block is designated by reference to a starting value, k, plus or minus multiples of eight. Of course, a DSP which operates at a different speed could alternatively be used and thereby operate on more or less than eight samples in a 4 ms block.

A window in which an rms current estimate may be calculated is 60 Hz and involves reading 32 consecutive current values. The horizontal lines located at the top of FIG. 5, above the DSP blocks, identify three 60 Hz cycle "windows" in which it may be possible to calculate an rms current value according to the process described above. Again, because the DSP operates in 4 ms intervals in which it can read 8 new current values, the windows are referenced relative to a value of k plus or minus a multiple of eight.

The three horizontally elongated blocks at the bottom of FIG. 5, below the DSP blocks, represent the periods over which three consecutive rms values are calculated using 32 consecutive current readings. The three rms estimates at the bottom of the Figure correspond to the three calculation estimate "windows" at the top of the Figure.

A second method of current estimation involves averaging four rms values. Each of the four rms values is computed using the above described method of plugging 32 current readings into an rms equation (equation 7 above). Under this method, in a four ms interval, eight readings are taken. These eight readings are used along with the previous 24 readings to calculate an rms current value. This rms current value is averaged with rms current estimates calculated in the same manner at each of the three preceding 4 ms intervals to arrive at a final current estimate. This final current estimate is subsequently used to determine if a fault has occurred.

Figure 6:
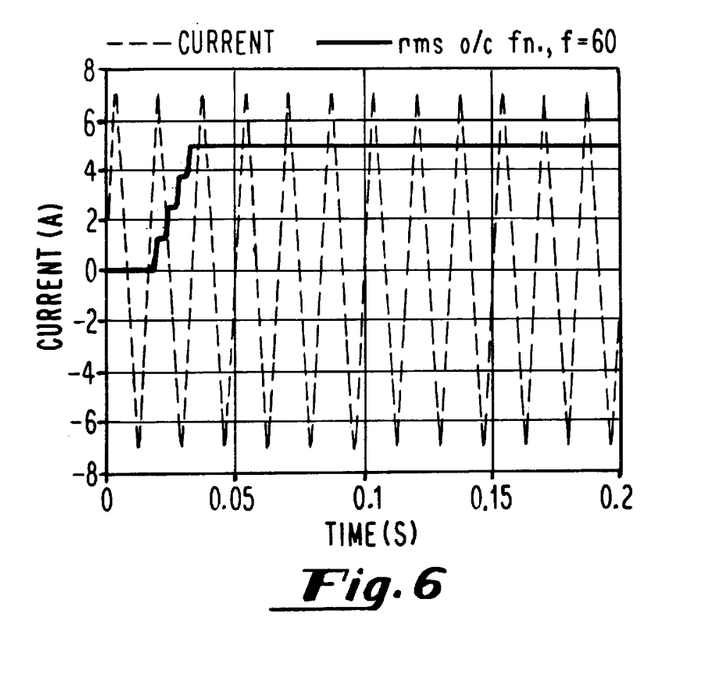
FIG. 6 provides a plot of actual current values for a 60 Hz input current along with a plot of a current estimate generated using a second rms estimation method.

FIG. 6 is a graph of an rms current estimate for a 60 Hz signal that is generated using this second method. As shown, for the 60 Hz signal the second method of current estimate also generates a constant estimate value.

Figure 7:
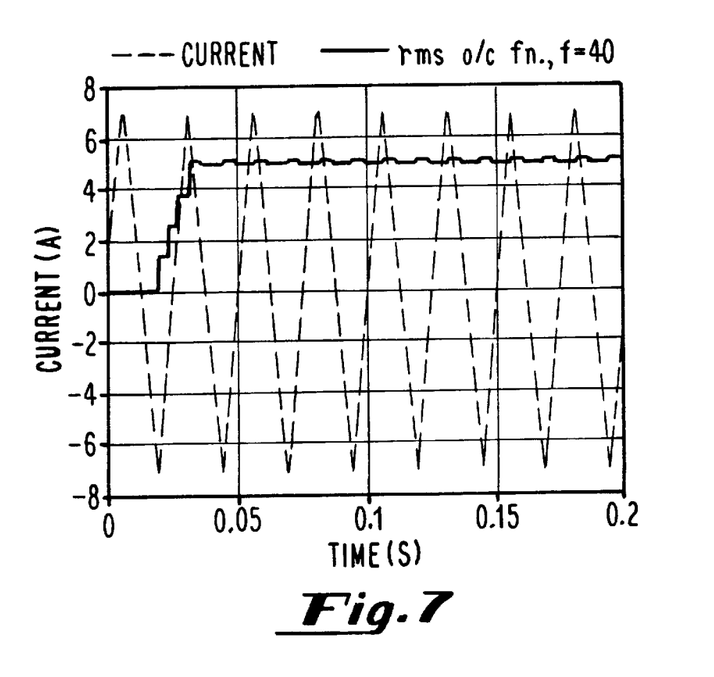
FIG. 7 provides a plot of the actual current values for a 40 Hz input current along with a plot of the current estimate generated using a second rms estimation method.

FIG. 7 is a graph of a current estimate for a 40 Hz signal that was generated using this second method of current estimation as described above. As shown, the rms current estimate for the 40 Hz input signal is not constant but rather oscillates between values as did the analogous graph shown in FIG. 3 for the first method of current estimating. However, the amplitude of the oscillations for the second method is reduced. Thus, the second method involving averaging four rms current values reduces variance and oscillation in the current estimate.

Figure 8A:
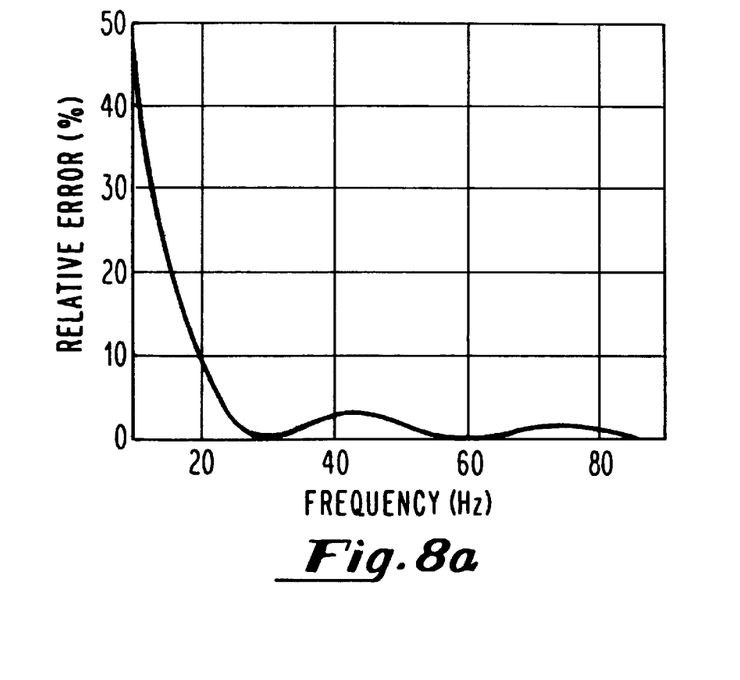
FIG. 8A is a graph of the relative percentage error in the rms current estimate generated using a second current estimation method for current input values having various frequency values.

FIG. 8A is a graph of the relative percentage error in a current estimate generated by this second method. As shown, the relative error for the current estimate goes to zero for frequencies that are multiples of 30 Hz. It should be noted that the relative error for rms current values calculated using the four block averaged method are lower than the error for rms current values calculated using the instantaneous rms over current estimates described in relation to FIGS. 2 through 4.

Figure 8B:
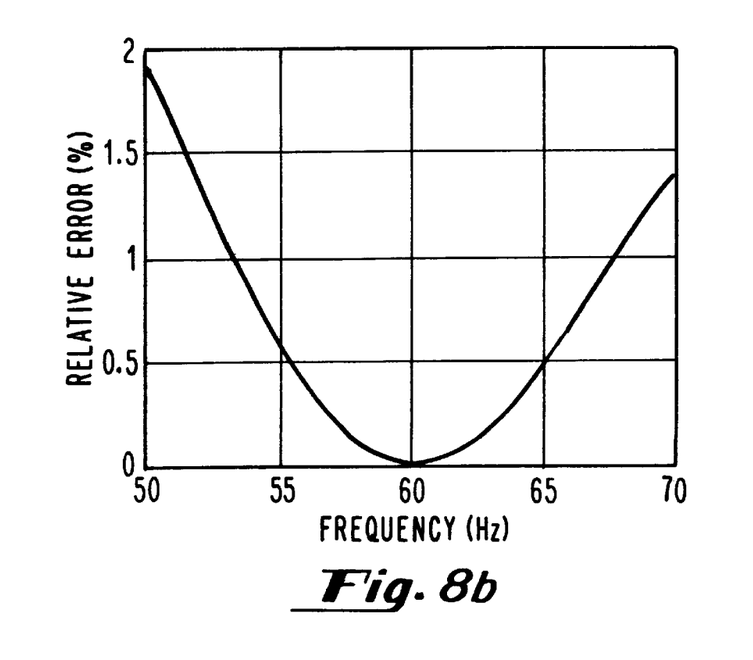
FIG. 8B is a detailed view of the relative percentage error in the rms current estimate generated using a second current estimation method for input current signals in the 50 to 70 Hz range.

FIG. 8B is a detailed view of the relative percentage error in the rms current estimate for input current signals in the 50 to 70 Hz range. As shown, the relative error for the four interval averaging method of calculating the rms current is less than 2% in the 50 to 70 Hz range and very close to 0% at 60 Hz.

Figure 9:
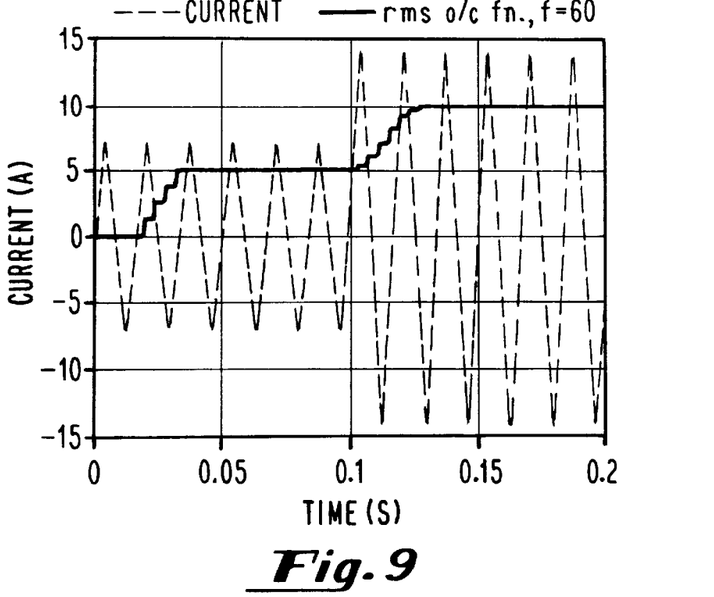
FIG. 9 is a graph of a current estimate generated using a second current estimation method for a 60 Hz input signal that undergoes a step change.

FIG. 9 is a graph of the current estimate calculated using this four interval averaging method for a 60 Hz input signal that undergoes a step change. As shown, there is a delay of approximately 1 and ¾ 60 Hz cycles or 30 ms between when the input signal changes and the current estimate changes. Because the estimate is calculated by averaging four rms values, it takes several 4 ms intervals before the rms current estimate reflects the full step-up value.

Figure 10:
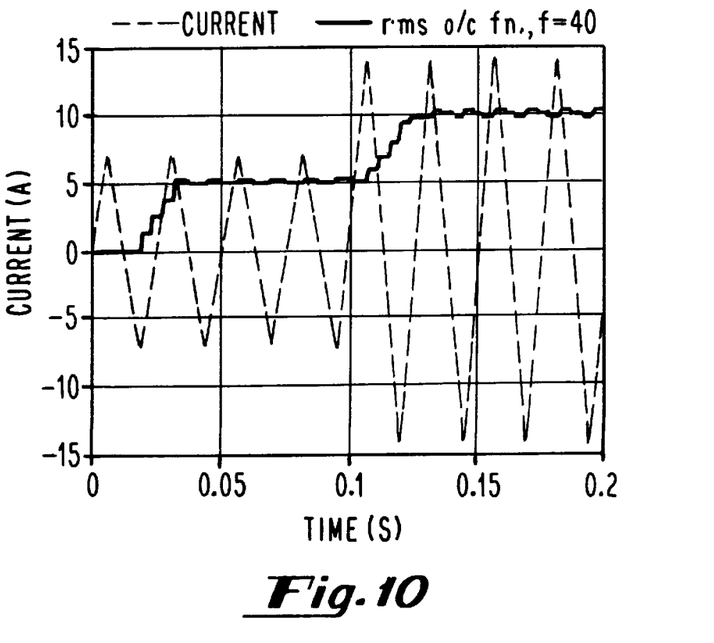
FIG. 10 is a graph of a current estimate generated using a second current estimation method for a 40 Hz input signal that undergoes a step change.

FIG. 10 is a graph of the current estimate calculated using a four interval averaging method for a 40 Hz input signal that has a step change. As shown, there is a delay of approximately 1 and ¾ 60 HZ cycles or approximately 30 ms similar to that shown in FIG. 9. Also, the rms estimate for the 40 Hz signal, in contrast to the 60 Hz input signal, has an oscillating element to the signal.

A third method of generating a current estimate involves averaging eight consecutive rms estimates. Similar to the second described method, an rms estimate is calculated every 4 ms using the first described method of plugging the most recent 32 samples into the rms equation described above. Eight rms values calculated 4 ms apart are averaged together to arrive at a current estimate.

Figure 11:
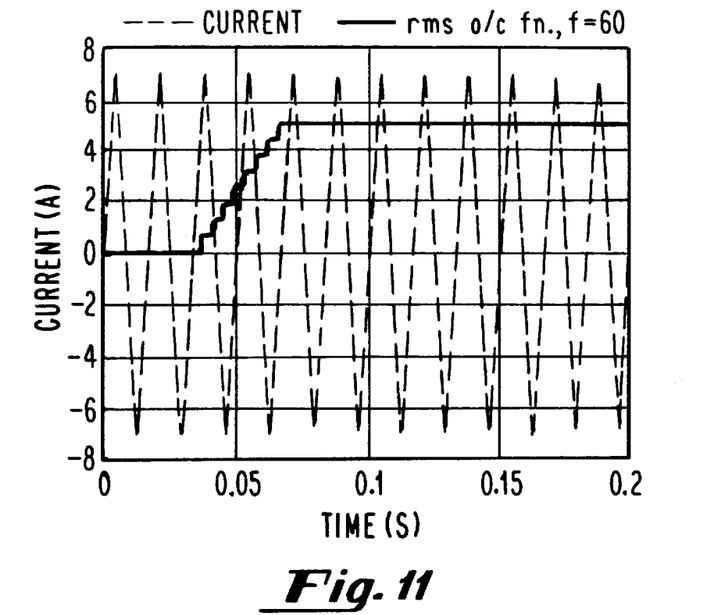
FIG. 11 provides a plot of actual current values for a 60 Hz input current along with a plot of a current estimate generated using a third rms estimation method.

FIG. 11 is a plot of the actual current readings for a 60 Hz input signal along with a plot of the current estimate calculated using this third method. As shown, similar to the previous two estimation methods, this third method of current estimation comes to a constant value for the 60 Hz signal.

Figure 12:
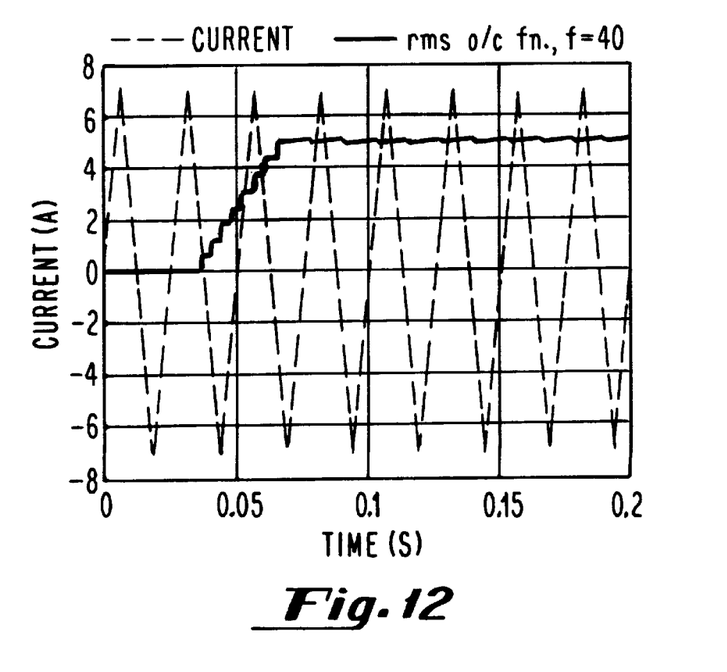
FIG. 12 provides a plot of the actual current values for a 40 Hz input current along with a plot of the current estimate generated using a third rms estimation method.

FIG. 12 is a plot of the actual current readings for a 40 Hz input signal along with a plot of the current estimate calculated using the third method of current estimation. Similar to the previous two estimates, the current estimate generated using this third method also has a oscillating shape for the 40 Hz input signal. However, the magnitude of the oscillation from the true rms value is reduced from that associated with the previous two estimate methods.

Figure 13A:
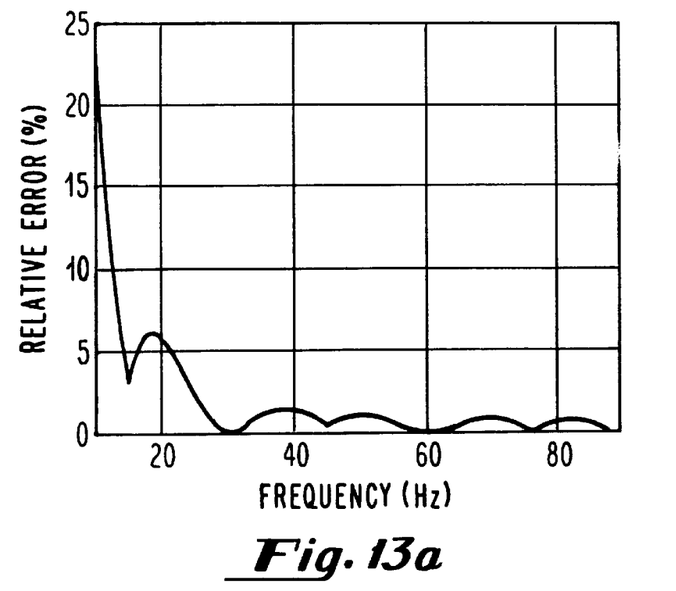
FIG. 13A is a graph of the relative percentage error in the rms current estimate generated using a third current estimation method for input current values having various frequency values.

FIG. 13A is a graph of the relative percentage error in the current estimate generated using this third method at various frequency values. As shown, the relative error for the rms current estimate goes to zero for frequencies that are multiples of 15 Hz. It should be noted that the relative error for current estimates calculated using the averaged eight rms value estimate are lower than the error for the two previously described estimation methods.

Figure 13B:
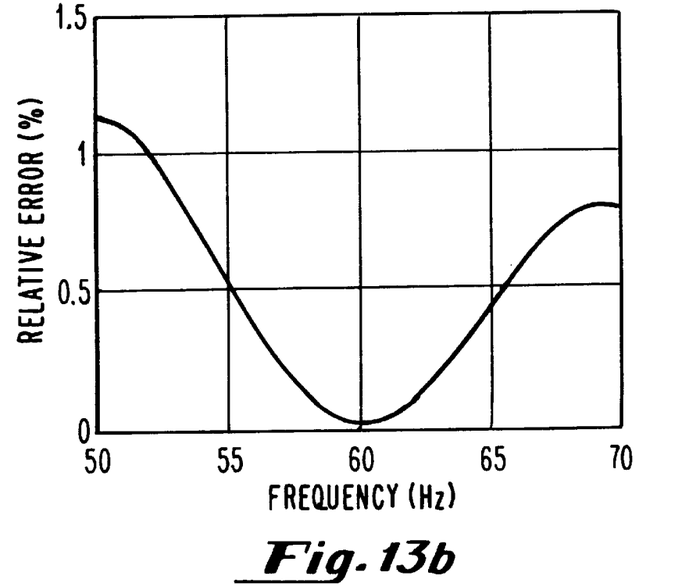
FIG. 13B is a detailed view of the relative percentage error in the rms current estimate generated using a third current estimation method for input current signals in the 50 to 70 Hz range.

FIG. 13B is a detailed view of the relative percentage error in the current estimate generated using this third method for signals in the 50 to 70 Hz range. As shown, the relative error for averaged eight rms value method of estimating the current is less than 1.5% in this range and very close to 0 at 60 Hz. Comparing FIG. 13B with FIG. 8B, one can see that the relative error is lower for the 8 block rms current estimate than the 4 block current estimate.

Figure 14:
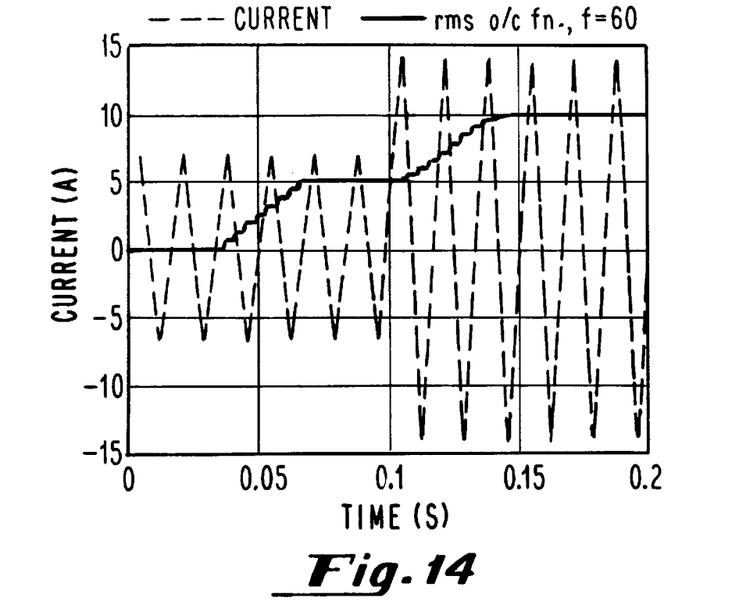
FIG. 14 is a graph of a current estimate generated using a third current estimation method for a 60 Hz input signal that undergoes a step change.

FIG. 14 is a graph of the rms current estimate calculated using an eight block averaged method during a step change in the 60 Hz input signal. As shown, there is a delay of approximately 2 and ¾ 60 Hz cycles between when the signal changes and the rms estimate changes. Because the estimate is calculated by averaging the previous seven rms values with the present rms value, it takes several 8 ms intervals before the rms current estimate reflects the full step-up value.

Figure 15:
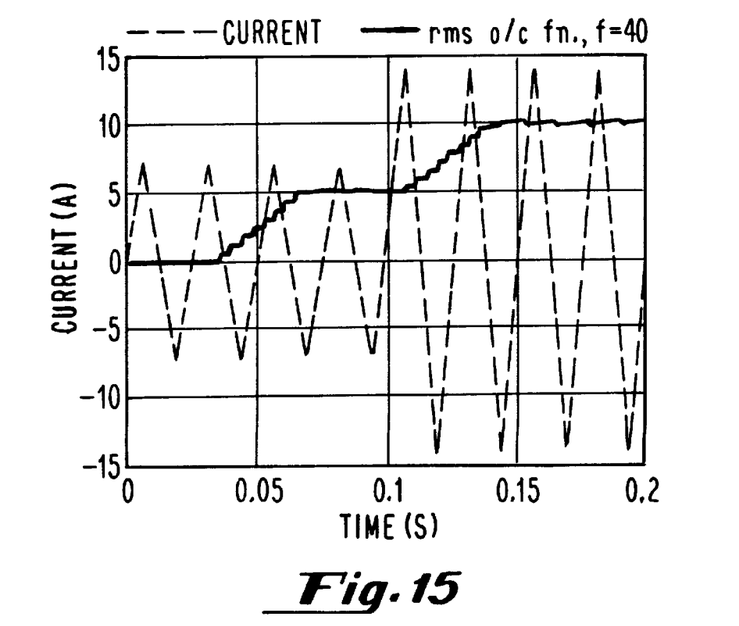
FIG. 15 is a graph of a current estimate generated using a third current estimation method for a 40 Hz input signal that undergoes a step change.

FIG. 15 is a graph of the rms current estimate calculated using an eight interval averaged method during a step change in a 40 Hz input signal. Like the estimate for the 60 Hz input signal, there is a delay of 2 and ¾ 60 Hz cycles between when the signal changes and the rms estimate changes. The current estimate has a slight oscillating component. However, as compared to the previous two methods of current estimation, the oscillation is reduced.

Figure 16:
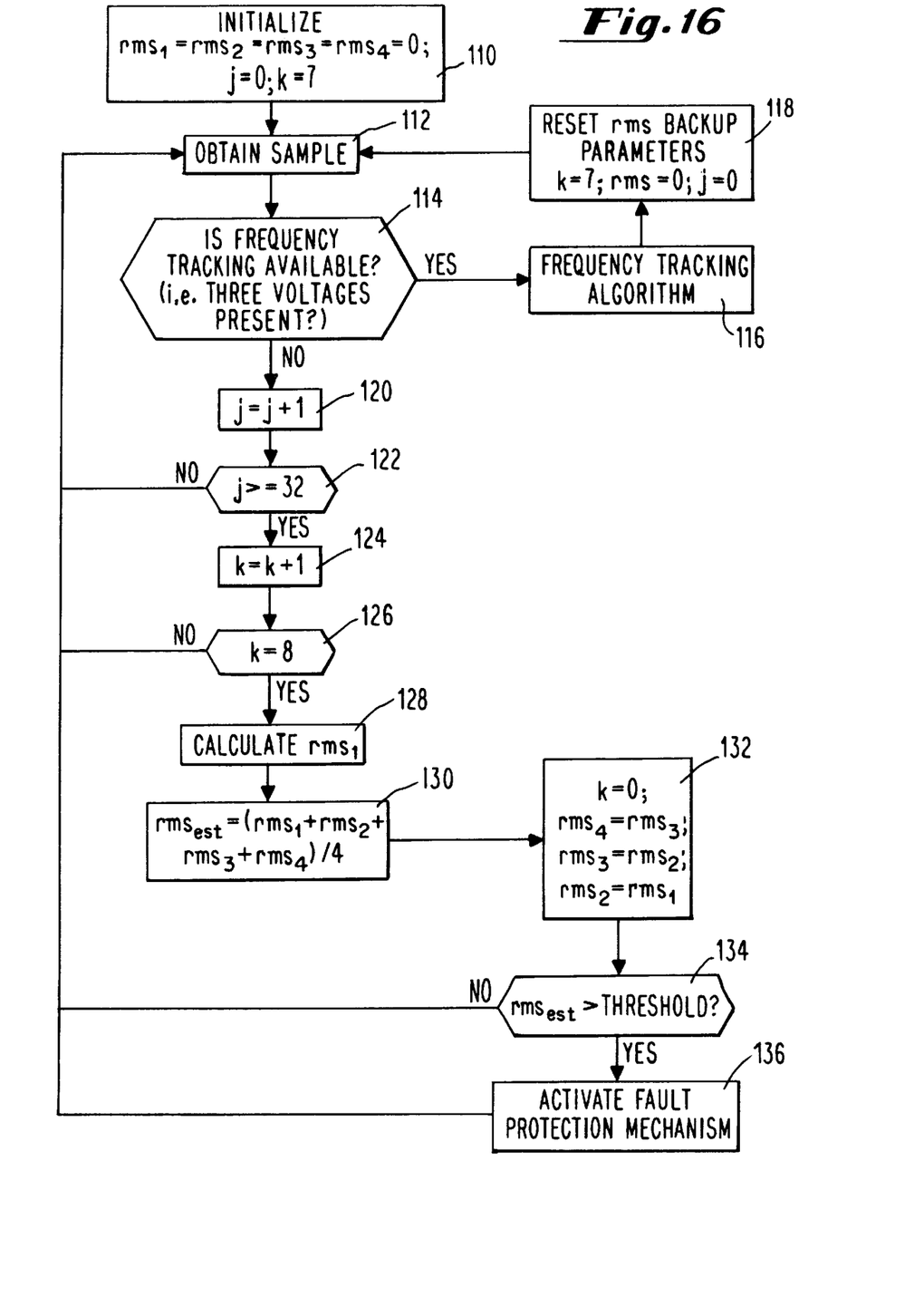
FIG. 16 is a flow chart of an inventive method of current estimation and fault protection.

Generating a current estimate for each of the three electrical phases is part of a larger inventive process of backup fault detection and protection. FIG. 16 is a flow chart of the inventive method of current estimation and fault protection. As will become apparent from the description below, the inventive method implements a method of backup protection using the second above described method of estimation; four rms values are averaged to arrive at a current estimate for fault detection. It should be noted that although the second above described method of averaging four rms current values is employed in the preferred embodiment, other means of rms estimation, including the two other methods described above, could alternatively be used.

At step 110, the system initializes to zero, counter variable, j, and four data variables, $rms_1$, $rms_2$, $rms_3$, $rms_4$, in which are held rms current estimates. Counter variable, k, is initialized to seven. At step 112, a sample current reading is taken which ultimately is used in the calculation of an rms estimate of the current.

At step 114, the system checks for whether frequency tracking is available in the system. Frequency tracking is available in most every circumstance except those where all phases of the input voltage become unavailable. When frequency tracking becomes unavailable, the fault detection procedures that are based upon the frequency tracking similarly become unavailable. This circumstance necessitates the backup fault detection process of the present invention. Thus, as shown in FIG. 16, when the frequency tracking is available, at step 116 a frequency tracking algorithm as described in U.S. patent application Ser. No. 08/574,357, entitled "System and Method for Phasor Estimation and Frequency Tracking in Digital Protection Systems," is executed. At step 118, rms backup parameters j, $rms_1$, $rms_2$, $rms_3$, and $rms_4$ are reset to zero. Variable k is set equal to 7. Thereafter, flow returns to step 112.

However, if at step 114 it is determined that frequency tracking is not available, which is the case when none of the three input voltages are present, the backup function is executed. At step 120, counter variable j is incremented by one. As noted above, in the present inventive method, 32 current samples are used to calculate an rms current value. Therefore, at least 32 current samples must be taken before an rms current value may be calculated. At step 122, it is determined whether j is greater than or equal to 32. If counter j is not equal to 32, indicating that less than 32 current readings have been made, at least one additional current sample is necessary and control returns to step 112. However, if at least 32 current samples have been taken, indicating that a sufficient number of samples have been taken to calculate an rms current value, control passes to the next procedural step.

At step 124, counter k is incremented by one. As noted above, in the preferred embodiment each of the four rms values that are used in generating an rms current estimate are calculated using 8 new current samples. Therefore, at step 126, it is determined whether counter k is equal to eight. If counter k is less than eight, an insufficient number of samples has been collected since the previous rms value was calculated, and control returns to step 112 where an additional current sample is read. If counter k is equal to eight, a sufficient number of current samples have been read to generate a new rms current value which can be used in generating an rms current estimate, and control passes to the next procedural step.

At step 128 an rms value is calculated. In the preferred embodiment, equation 7 above is employed to make this calculation. The rms value is stored in variable $rms_1$. At step 130, a current estimate is calculated by averaging $rms_1$, $rms_2$, $rms_3$, and $rms_4$. At step 132 the variables are reset as follows: counter variable k is set to zero; $rms_4$ is set equal to $rms_3$; $rms_3$ is set equal to $rms_2$; and $rms_2$ is set equal to $rms_1$.

At step 134, the current estimate is compared with a threshold value. The threshold value represents the predetermined value over which it is assumed a fault has occurred. In the preferred embodiment, a suggested threshold value is about 70% of the rated current. If the current estimate is below the threshold, indicating that no fault has occurred, control returns to step 112 where new current samples are read. As noted above, the current estimate is equivalent to the average of four consecutive rms current values. Thus, it may take several iterations, probably at least four, of the above described process of generating an rms current value in order to arrive at a current estimate that may be near the threshold value.

However, if at step 134 the current estimate is above the threshold value, indicating that the current is sufficiently high to necessitate fault protection, control passes to step 136. At step 136, the fault control mechanism is activated. In the preferred embodiment, the fault control mechanism is a circuit breaker which is opened to halt the flow of current.

Figure 17:
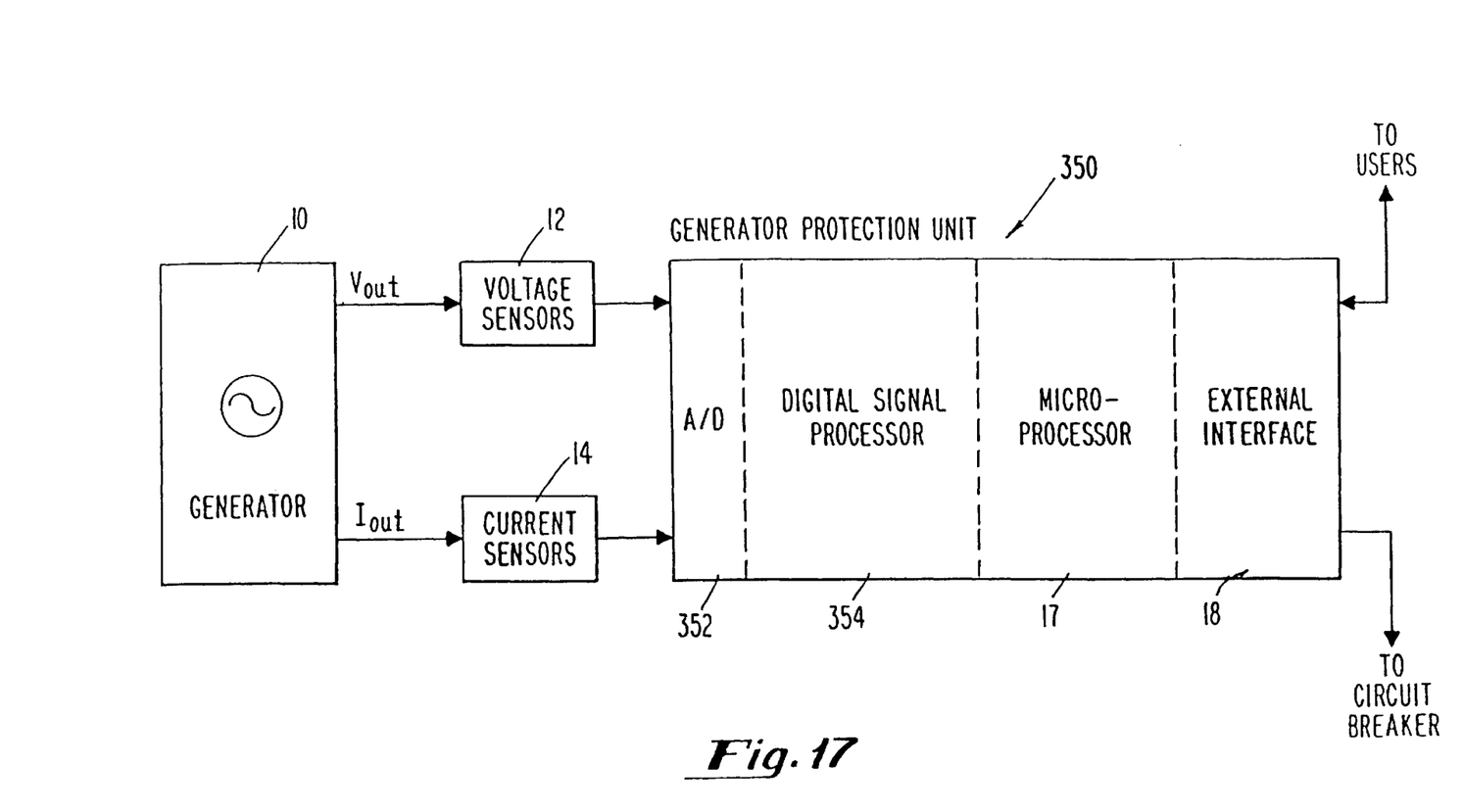
FIG. 17 is a block diagram of a generator protection unit in accordance with the present invention.

A block diagram for an apparatus in accordance with the present invention for implementing the above process is shown in FIG. 17. GPU 350 is programmed in accordance with the current estimation and fault detection procedure described hereinabove. Generator 10, current sensor 14, voltage sensor 12, and external interface 18 function in a substantially identical manner as described in connection with FIG. 1. A/D converter 352 is programmed to sample at a fixed sampling interval. DSP 354 is specifically programmed in accordance with the present invention to generate rms current values as described above. These rms values are used by microprocessor 17 to generate a current estimate using the methods described above. Thereafter, microprocessor 17 compares the current estimate to a threshold value and triggers the appropriate fault prevention mechanisms, i.e. circuit breaker, if necessary.

While the invention has been described and illustrated with reference to specific embodiments, those skilled in the art will recognize that modification and variations may be made without departing from the principles of the invention as described hereinabove and set forth in the following claims. In particular, any number of methods of estimating the current using the rms equation could be used. For example, the averaged eight sample method described above could have been used instead of the averaged four sample method.

What is claimed is:

1. A method of over current backup for a system having a current signal, comprising the steps of:
   (a) obtaining a current measurement;
   (b) determining whether frequency tracking is available;
   (c) if frequency tracking is available, employing said frequency tracking to provide fault protection; and
   (d) if frequency tracking is not available, providing fault protection by performing the following steps:
   (e) obtaining additional current measurements until a sufficient number of current measurements have been obtained to calculate a root mean square (rms) current value;
   (f) generating a rms current value from said sufficient number of current measurements;
   (g) repeating steps (e) and (f) to generate a plurality of rms current values;
   (h) generating a current estimate from said plurality of rms current values; and
   (i) activating a fault protection mechanism if said current estimate is above a predetermined threshold.

2. The method of claim 1, wherein a sufficient number of current measurements is 32.

3. The method of claim 1, wherein each of said plurality of rms current values, $c_{rms}$, is estimated according to the following relationship:

$$c_{rms} = \sqrt{\frac{1}{N}\sum_{k=0}^{N-1} f_k^2}$$

where $f_k$ is the current sample at a particular instant and N is the number of samples per cycle of input current.

4. The method of claim 3, wherein each successive rms current value of said plurality of rms current values is calculated using eight current samples which were collected after the previous rms current value was calculated.

5. The method of claim 3, wherein the number of samples per cycle of input, N, is 32.

6. The method of claim 1, wherein said current estimate is the average of said plurality of rms current values.

7. The method of claim 1 wherein said current estimate is the average of four consecutive rms current values.

8. The method of claim 1 wherein said threshold value is about 70% of the rated value of the system.

9. The method of claim 1 wherein said fault protection mechanism comprises opening a circuit breaker.

10. A method for over current backup protection in a generator protection unit (GPU), wherein the GPU receives a plurality of current signals from a generator, the method comprising the steps:
 (a) obtaining a current measurement;
 (b) determining whether frequency tracking is available;
 (c) if frequency tracking is available, employing said frequency tracking to provide fault protection; and
 (d) if frequency tracking is not available, providing fault protection by performing the following steps:
  (e) obtaining additional current measurements until a sufficient number of current measurements have been obtained to calculate a root mean square (rms) current value;
  (f) generating a rms current value from said sufficient number of current measurements;
  (g) repeating steps (e) and (f) to generate a plurality of rms current values;
  (h) generating a current estimate from said plurality of rms current values; and
  (i) activating a fault protection mechanism if said current estimate is above a predetermined threshold.

11. The method of claim 10, wherein each of said plurality of rms current values, $c_{rms}$, is estimated according to the following relationship:

$$c_{\text{rms}} = \sqrt{\frac{1}{N} \sum_{k=0}^{N-1} f_k^2}$$

where $f_k$ is the current sample at a particular instant and N is the number of samples per cycle of input current.

12. The method of claim 10, wherein said current estimate is the average of said plurality of rms current values.

13. An apparatus for over current backup protection in a system transmitting current, comprising:
 a current sensor for sensing the current being transmitted;
 an A/D converter operably coupled to said current sensor for sampling the sensed current at a fixed sampling interval;
 a digital signal processor (DSP) operably coupled to said A/D converter for generating rms current values from the sensed current; and
 a microprocessor operably coupled to said DSP, having code therein for performing the following steps:
  (a) obtaining a current measurement;
  (b) determining whether frequency tracking is available;
  (c) if frequency tracking is available, employing said frequency tracking to provide fault protection; and
  (d) if frequency tracking is not available, providing fault protection by performing the following steps:
   (e) obtaining additional current measurements until a sufficient number of current measurements have been obtained to calculate a root mean square (rms) current value;
   (f) generating a rms current value from said sufficient number of current measurements;
   (g) repeating steps (e) and (f) to generate a plurality of rms current values;
   (h) generating a current estimate from said plurality of rms current values; and
   (i) activating a fault protection mechanism if said current estimate is above a predetermined threshold.

14. A generator protection system for analyzing current signals output from a generator wherein the current signals are monitored by current sensors to produce a plurality of signals representative of the current of the generator, the generator protection system comprising:
 sampling means for receiving an input of the plurality of current signals and sampling the plurality of current signals at a predetermined fixed rate to provide an output of sampled current signals; and
 a processing means coupled to the sampling means and receiving an input of the sampled current signals, the processing means being operable to perform the following steps:
  (a) obtaining a current measurement;
  (b) determining whether frequency tracking is available;
  (c) if frequency tracking is available, employing said frequency tracking to provide fault protection; and
  (d) if frequency tracking is not available, providing fault protection by performing the following steps:
   (e) obtaining additional current measurements until a sufficient number of current measurements have been obtained to calculate a root mean square (rms) current value;
   (f) generating a rms current value from said sufficient number of current measurements;
   (g) repeating steps (e) and (f) to generate a plurality of rms current values;
   (h) generating a current estimate from said plurality of rms current values; and
   (i) activating a fault protection mechanism if said current estimate is above a predetermined threshold.

* * * * *